United States Patent

[11] 3,598,987

| [72] | Inventor | Vernon L. Kipping<br>San Francisco, Calif. |
|---|---|---|
| [21] | Appl. No. | 718,390 |
| [22] | Filed | Apr. 3, 1968 |
| [45] | Patented | Aug. 10, 1971 |
| [73] | Assignees | J. Roger Jobson;<br>John P. Costello<br>San Francisco, Calif., part interest to each |

[54] MIRROR WITH OPTICAL LIGHT SOURCE
9 Claims, 6 Drawing Figs.

[52] U.S. Cl. ............................................. 240/6.45 R, 240/1 EL
[51] Int. Cl. ............................................. F21v 33/00
[50] Field of Search ................................... 240/1 EI, 4.2, 6.45, 6.4, 6

[56] References Cited
UNITED STATES PATENTS

| 2,461,315 | 2/1949 | Virgilis | 240/4.2 |
|---|---|---|---|
| 2,515,437 | 7/1950 | Bisch et al. | 240/6.45 |
| 3,377,476 | 4/1968 | Milam et al. | 240/6.45 |
| 3,435,199 | 3/1969 | Ely | 240/4.2 |

FOREIGN PATENTS

| 904,704 | 3/1945 | France | 240/4.2 |
|---|---|---|---|

Primary Examiner—Samuel S. Matthews
Assistant Examiner—Richard L. Moses
Attorney—Julian Caplan ABSTRACT: A mirror, preferably hand held, has a light source disposed behind the mirror and an integral source of electric current. The light source is located relative to a light reflective surface to direct light through an annular lens surrounding the mirror so that the light shines onto the face of the user to provide sufficient illumination to permit use independent of other light. The light produced is shadowless and characterized by softness. The systems employ reflective and refractive optics to converge and distribute light uniformly over the field of illumination.

INVENTOR.
VERNON L. KIPPING
BY Julian Caplan
ATTORNEY

PATENTED AUG 10 1971

3,598,987

INVENTOR.
VERNON L. KIPPING
BY
Julian Caplan
ATTORNEY

INVENTOR.
VERNON L. KIPPING
BY
Julian Caplan
ATTORNEY

MIRROR WITH OPTICAL LIGHT SOURCE

This invention relates to a mirror with integral optical light source. A bulb is located behind the mirror and the light from the source is directed parallel to and behind the mirror to a reflective surface which bends the light in an annular pattern surrounding the mirror focusing in front of the mirror where the face of the user would normally be located. Hence the light source provides sufficient illumination for use of the mirror even in the dark. The light path is such that the illumination is soft and flattering making the device particularly useful for application of cosmetics. A preferred use of the invention is installed in compacts, although it has further application in vanity mirrors or even in shaving mirrors.

An important feature of the present invention is that it utilizes reflective and refractive optics to converge light rays from the light source an distribute same in a field of uniform intensity.

Another important feature is the means for controlling the quality of light with respect to softness or hardness by controlling the surfaces of the lens and reflector face. A satin finish will produce a soft light, while a mirror surface produces a harder light.

Another feature of the invention is the fact that the light is preferably evenly distributed around the mirror and thus produces a shadowless light, and because the light is indirect, it has a soft and flattering quality.

Another important feature of the invention is the fact that the light bulb and battery are compact so that the mirror may be installed in a ladies' compact or in any event will fit in a purse or pocket. It will be understood, however, that the invention may be made in larger sizes for table or wall installation.

Another feature of the invention is that the "temperature" of the light may readily be controlled by tinting the light source, reflector surface, lens surface, or the light conductive material. Thus a pink tint is particularly flattering where the device is principally used in applying cosmetics.

In one embodiment of the invention, the mirror is installed on one surface of a light conductive plastic material and the bulb is imbedded in a hole in the plastic behind the mirror. The plastic transmits the light radially beyond the margins of the mirror and then reflects the light outwardly transverse to the mirror, focusing on the face of the user. In another embodiment of the invention, the casing behind the mirror is made highly reflective and preferably the back of the mirror is highly reflective. A light bulb is suspended behind the mirror reflecting on the back of the mirror and the walls of the casing. The casing beyond the periphery of the mirror is curved in such manner as to deflect the light outwardly and also to focus the same to achieve the same result as the lamp heretofore described.

An important feature is that the design of the unit permits it to be incorporated into a slender configuration enhancing its portability and permitting attractive designs and styling.

Other objects of the present invention will become apparent upon reading the following specification and referring to the accompanying drawings.

Figure 1:
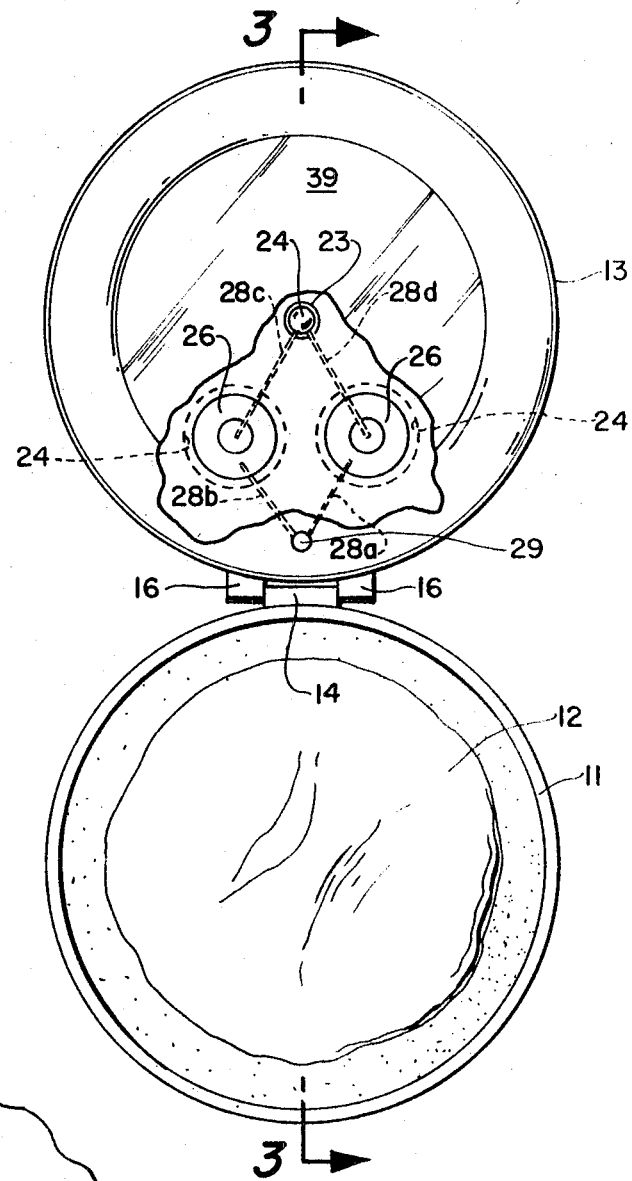
FIG. 1 is a top plan view of a ladies' compact in which the present invention is installed.

Directing attention to the form of the invention shown in FIGS. 1—4, a typical installation in a ladies' compact is shown. Such a compact has a bottom casing 11 in which is installed means 12 for holding cosmetics such as face powder. It will be understood that the contents of bottom casing 11 is subject to wide variation. Hinged to casing 11 is a lid casing 13 in which the present invention is installed. Hinge means comprising lugs 14, 15, 16 are attached to casings 11 and 13, respectively, and are interconnected by a hinge pin 17, it being understood that the hinge construction is subject to considerable variation. It will further be understood that although the device is shown in a compact, nevertheless the casing 13 may be for a hand-held mirror which is independent of the base 11, it may be attached to an easel, may be wall mounted, or may be adapted to a wide variety of other uses.

Figure 2:
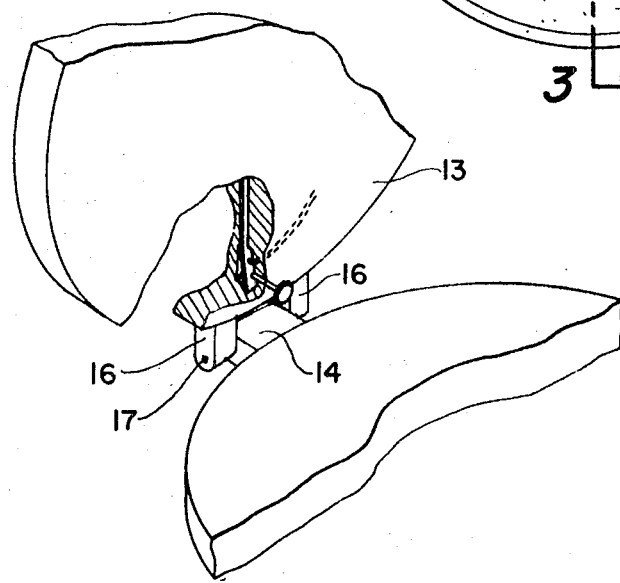
FIG. 2 is a fragmentary perspective view partly broken away in section to show the hinge and switch construction which may be used.
Figure 3:
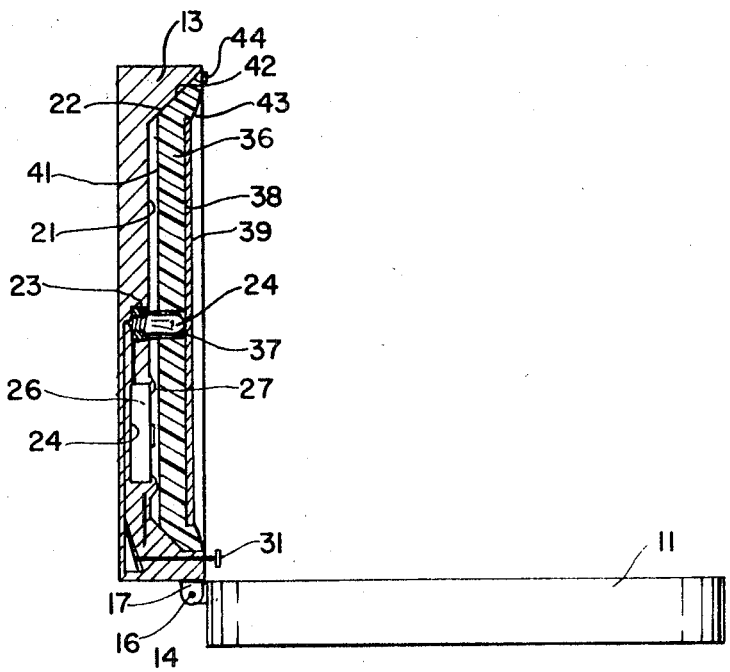
FIG. 3 is a sectional view taken substantially along the line 3—3 of FIG. 1.

Casing 13 is preferably formed of plastic material and may be circular. A central cavity is formed in casing 13 having a bottom wall 21 and sides 22 which slant upwardly-outwardly preferably at about a 45° angle. Imbedded centrally in wall 21 is a conductive socket 23 which receives a miniature light bulb 24 such as a "wheat" bulb. Formed in wall 21 is at least one pocket 24 to receive a disk-type electric battery 26. The plastic of casing 13 is formed with an overhanging lip 27 which permits the battery 26 to be snapped into pocket 24 but which further permits the battery to be pried out when it is necessary to change the same. To provide sufficient voltage for a common wheat lamp 24, two batteries 26 are required and hence there are, as is best shown in FIG. 1, two pockets 24 to accommodate two batteries 26 connected in series. Wires 28a—28d interconnect the batteries and further connect the same with a switch 29. One form of switch 29 is shown in FIG. 2, it being understood that this is merely typical of one of a variety of switches which may be used. A stud 31 normally projects outward from the casing 13 when the compact is opened. However, when the compact is closed, stud 31 contacts a portion of base casing 11 which depresses stud 31. The inner end of stud 31 has a pin 32 which contacts a spring electrical contact 33. When the stud 31 is projected, contact 33 is in electrical engagement with a stationary contact 34, but when the stud 31 is depressed contacts 33 and 34 are separated. The resilient character of contact 33 restores electrical connection whenever the lid 13 is opened. Contacts 33 and 34 are connected to wires 28a and 28b, respectively. The electrical circuit, of which that shown in FIG. 1, is merely representative, insures illumination of bulb 24 each time that the lid 13 is opened.

Figure 6:
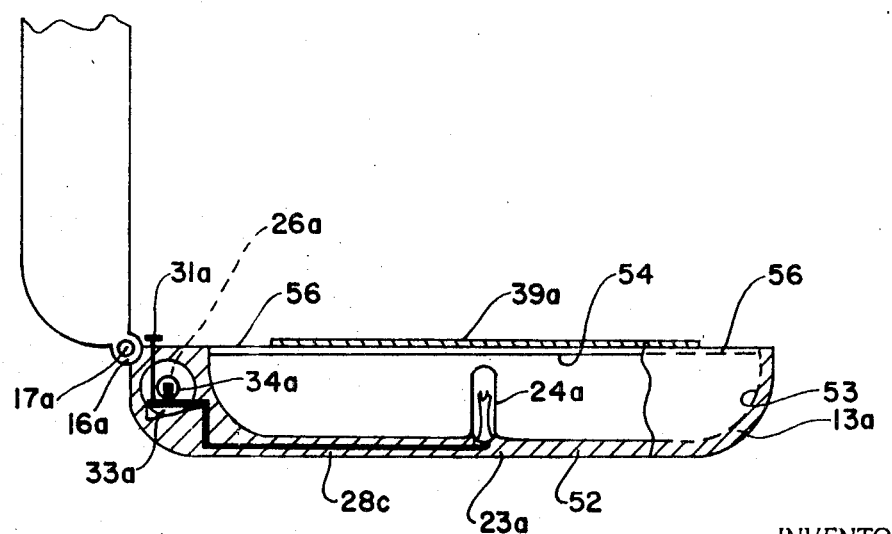
FIG. 6 is a sectional view taken substantially along the line 6—6 of FIG. 5.

Mounted within base casing 13 is a plastic disk 36 having a central hole 37 into which bulb 24 projects and having mounted on a central depression 38 thereof a mirror 39, here illustrated in a round shape which is generally preferred. The back 41 of plastic disk 36 is flat and either highly polished or silvered so that light from lamp 24 is conducted radially outwardly behind the mirror 39 with considerable efficiency. Beyond the periphery of mirror 39 the back surface of disk 36 is formed bevelled as indicated by reference numeral 42, the angle of the bevel being about 45° so as to reflect the light outwardly relative to mirror 39. Bevelled surface 42 may be curved in the manner shown for surface 53 of FIG. 6, so as to direct and focus light rays in a converging field pattern without window 56 being formed as an annular lens 43. Alternatively, the optical action of converging and focusing can be accomplished in concert with annular lens 43 and optical reflective surface 53. Preferably the surface 43 of disk 36 surrounding mirror 39 is formed in an annular lens. Casing 13 is formed with a flexible overhanging lip 44. Disk 36 snaps into place inside lip 44 but may be displaced when it is necessary to replace bulb 24 or battery 26.

Figure 4:
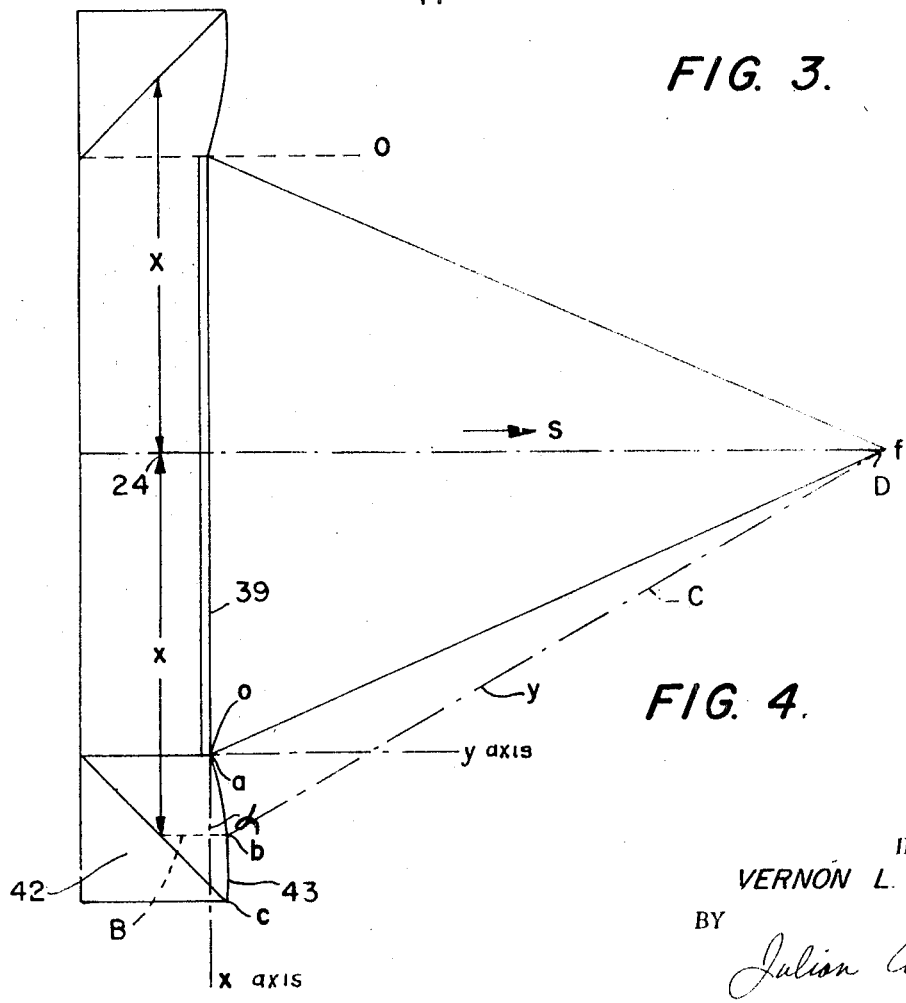
FIG. 4 is a partially schematic view showing the light path of the invention.

Directing attention now to FIG. 4, the path of light from bulb 24 is illustrated schematically. Line A represents the radial path of the light from bulb 24 behind mirror 39. Broken line B indicates bending of the light by reflective surface 42 and line C represents the focusing of the light by lens 43 so as to converge approximately on a focal point D spaced from mirror 39 about 5 inches, which is a normal distance for a hand mirror to be held in front of the face when applying cosmetics and the like. It will be understood that the distance of point D from mirror 39 is subject to variation and further that a sharp focus is not essential. Features of the illumination provided are its indirect character since the bulb 24 is behind the opaque mirror 39 and the fact that the light source is from an annular ring 39 which makes the illumination shadowless. Further, the tone qualities of the light are pleasant and may be enhanced by tinting either the surface of bulb 24, the plastic 36, the surfaces 41 or 42, or the surface of lens 39.

With further reference to FIG. 4, outer surface alpha of lens 39 is a complex surface which is the same in the Theta coordinate, and in the $x, y$ plane can be represented by an equation of the form:

$y=a+bx+cx^2$ wherein $y$ is the distance form the inside edge of the lens to the desired focal point $f$, $x$ is the distance from the central axis to a circle midway between the lower and upper corners of surface 42, $a$ is the inner edge of the lens, $b$ is the distance on the $x$ axis to the midpoint of alpha and $c$ is the distance to the outer edge of alpha.

The foregoing equation may be expressed more compactly:

$$y=\sum_{i=0}^{i=\infty} a_i x^i$$

The general focal area for the illumination is controlled in size and distance from the mirror by the coefficients $a_i$.

The coefficients $a, b, c$, which depend on the specific curvature of the lens surface on the $x-y$ plane, are different for different curvatures.

Assuming a mirror of 2.5-inch diameter and lens of 0.5-inch width, overall width of 3.0 inch and a focal length of 5 inch,

|   | $x$ | $y$ |
|---|-----|-----|
| $a$ | 0   | 0   |
| $b$ | 0.5 | 0.1 |
| $c$ | 1.0 | 0.14 |

Figure 5:
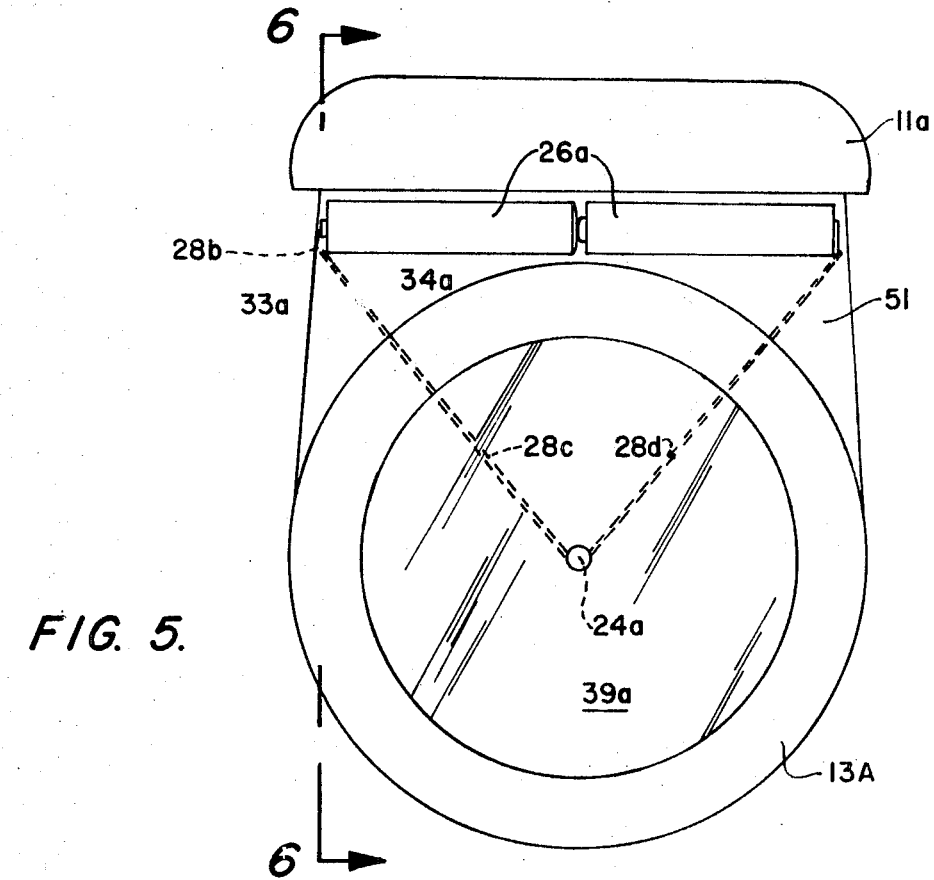
FIG. 5 is a plan of a modification.

Directing attention now to the form of the invention shown in FIG. 5, many of the parts are substantially the same as that in the preceding modification and the same reference numerals followed by the subscript $a$ are employed to designate corresponding parts. In this form of the invention, casing 13$a$ is formed with a hollow lateral offset 51 in which are installed two batteries 26$a$ which are here shown to be of the "pen light" type connected in series. Light 24$a$ may be installed with its major axis parallel to the back of mirror 39$a$ to conserve space. A stud 31$a$ projecting from casing 13$a$ is depressed by lid 11$a$ when the device is closed and enters the space between contacts 33$a$ and 34 $a$ to interrupt electrical contact therebetween, but when the lid is opened, the resilient character of the contact 33$a$ closes the circuit.

The inside of casing 33$a$ is highly reflective. The back 52 is flat and parallel to the back of mirror 39$a$. The inside edges 53 are curved so that light from bulb 24$a$ is reflected outwardly around the periphery of mirror 39$a$. The casing 13$a$ is preferably closed off by a flat disk 54 on which the mirror 39$a$ is mounted. An annular gap 56 surrounds mirrors 39$a$, said gap being transparent to permit the light reflected by surface 53 to be emitted. Either the back of mirror 39$a$ or the portion of disk 54 within gap 56 is made highly reflective. The illumination afforded by this embodiment is characterized by great brightness and soft shadowless quality of the light. It is particularly suitable for applications such as shaving mirrors, theatrical makeup mirrors, and the like.

What I claim is:

1. A mirror with optical light source comprising a hollow frame, a planar mirror closing off the center of said frame, an electric light bulb positioned within said frame immediately behind said mirror, first means establishing a light-transmitting medium from said bulb radially outwardly parallel to and in close proximity to the back of the said mirror, second means establishing a light-focusing surface at the outer perimeter of said first means beyond the margin of said mirror, said second means shaped to focus light from said bulb at a point disposed in front of the center of said mirror and spaced from said mirror to afford illumination of the face while looking into the mirror, said first means being circular and said second means being annular, whereby light is reflected from said bulb in an annular beam around the perimeter of said mirror.

2. A source according to claim 1, which further comprises a battery and a switch wired in series with said bulb.

3. A source according to claim 2, installed in a woman's compact having hinged cosmetic receptacle means and a lid in which said source is installed, said switch operable to energize said bulb when said lid is opened.

4. A source according to claim 1, in which said frame has a light reflective flat back parallel to the back of said mirror and a curved perimeter, said first means established by the reflective back of said mirror and of said back of said frame, said second means comprising the curved perimeter of said frame.

5. A source according to claim 1, in which said first means comprises an annular transparent plastic disk, said second means comprising the beveled outer back corner of said disk.

6. A source according to claim 5, in which the front of said disk outside the margin of said mirror comprises an annular lens of curved cross section.

7. A source according to claim 6, in which the curvature of said cross section is expressed:

$$y=\sum_{i=0}^{i=\infty} a_i x^i$$

when $y$ is the distance from the lens to the point of focus, $x$ the distance from the center of said bulb to the middle of said beveled outer back corner, and $a$ is the distance from the center of said bulb to the inner edge of said lens.

8. A source according to claim 5, in which said bulb is installed in the center opening of said disk, said opening only slightly larger than said bulb.

9. A source according to claim 5, in which said frame is formed complementary to the back of said disk and is further formed with a first pocket for said bulb and a second pocket for a battery and which further comprises a battery for said bulb installed in said second pocket.